United States Patent [19]

Levin

[11] Patent Number: 4,551,720

[45] Date of Patent: Nov. 5, 1985

[54] PACKET SWITCHING SYSTEM

[75] Inventor: Michael M. Levin, Agoura Hills, Calif.

[73] Assignee: Cybernetic Data Products, Chatsworth, Calif.

[21] Appl. No.: 478,970

[22] Filed: Mar. 25, 1983

[51] Int. Cl.[4] .......................... H04Q 9/00; H04J 3/12
[52] U.S. Cl. ................................ 340/825.52; 370/83; 340/825.68; 340/717
[58] Field of Search ...................... 340/825.52, 825.53, 340/825.44, 825.68, 750, 717, 801-804; 370/94, 99, 60, 83, 61, 43

[56] References Cited

U.S. PATENT DOCUMENTS

| | | | |
|---|---|---|---|
| 4,091,361 | 5/1978 | Eichelberger et al. | 340/825.68 |
| 4,125,746 | 11/1978 | Downey et al. | 370/83 |
| 4,156,111 | 5/1979 | Downey et al. | 370/83 |
| 4,168,469 | 9/1979 | Parikh et al. | 370/83 |
| 4,438,432 | 3/1984 | Hurcum | 370/43 |

Primary Examiner—Donald J. Yusko
Attorney, Agent, or Firm—Nilsson, Robbins, Dalgarn, Berliner, Carson & Wurst

[57] ABSTRACT

A packet switching system includes encoding circuitry for generating and intermittently transmitting a plurality of data packets in serial bit stream format. Each data packet consists of a plurality of data words and one or more address words where each such word includes an initial constant value start bit, either a data byte or an address byte, and a steering bit which indicates whether the word is the last to occur address word in the packet. The address byte represents a dimensional identity common to all of the data words in the data packet. The system also includes decoding circuitry including a start bit decoder for sensing the presence of a start bit and a shift register having a number of storage locations equal to the total number of bits in the one or more address bytes, into which bits from the serial bit stream are serially shifted. A register control circuit enables the shift register to receive only the address or data byte bits. A steering bit circuit senses the occurrence of the steering bit and generates an output signal when the word being received is the last to occur address word.

17 Claims, 8 Drawing Figures

PACKET SWITCHING SYSTEM

BACKGROUND OF THE INVENTION

The present invention relates to interfaces for electronic communications systems and particularly to a packet switching system which enables a data matrix to be converted to a serial bit stream which is transmitted over a single data link such as twisted pair and thereafter reconstituted in real time.

Data transmission from a central data source to one or more utilization circuits, such as a display, generally takes one of two forms. In the first form, the data is transmitted to the utilization circuit in parallel and in real time. While such a system is desirable in many applications, the method requires a multiplicity of conductors, drivers, and other components and is limited as to the number of loads and distance between data source and utilization circuit. Consequently, it is a relatively high cost system which is inherently low in reliability.

The second form of data transmission is serial but not in real time. This method requires extensive hardware to receive, store, and reformat the data. Such non-real time serial data transmission will necessarily be of limited speed as well.

The present invention overcomes the above disadvantages and provides a novel method of serial data transmission in real time. The method and apparatus has particular application in the field of multiplex displays. Multiplex displays commonly use two latches, one for column select and one for row select. In a conventional multiplex display, first the column latch is loaded and then the first row latch is enabled thus activating the first row of lights in the display. Thereafter, the row latch is disabled, new data is loaded into the column latch, and the next row latch is enabled. This process is repeated continuously and produces a stationary or moving image on the display.

By contrast, the present invention generates a series of data words each containing the data byte from one cell in a matrix array desired to be transmitted to a remote utilization circuit. Following each set of data words representative of the sequentially sampled data in one dimension, a final address word is formed which does not contain data but rather contains the address of, for example, a row from which all of the immediately preceding data bytes were obtained. A flag or steering bit in each word indicates to the decoding or receiving circuitry whether the transmitted word constitutes a data word from the matrix or an address word.

At the remote utilization circuit, the serial string of data is first synchronized by sensing, e.g., an always low start bit. Thereafter, the data address byte of each received word is shifted into a shift register equal in length to the length of the data and address byte. The data byte and address byte have the same number of bits. Hence, if the data byte has eight bits, the shift register would also be eight storage locations. Once the eight address or data bits have been shifted into the shift register, further shifting into the shift register is disabled until the next start bit of the next word is sensed at which time the data will be shifted out of the shift register as new data is shifted in. Therefore, when the shift register is disabled, one and only one complete data or address byte will appear in the shift register. Immediately after data or address bits are shifted into the shift register, logic circuitry looks at the steering bit and determines whether the data in the shift register constituted a data byte or an address byte. If, in fact, the information is an address byte, then the data in the shift register may be appropriately sampled and decoded to obtain the address information. That information may then be transferred to a suitable utilization circuit. The previously received series of data bytes could also be transferred to the utilization circuit to be gated to the appropriate memory or display row indicated by the address information. Thus, it will be appreciated that the transmission is real time and does not require substantial memory or decoding logic.

SUMMARY OF THE INVENTION

A packet switching system includes an encoding means for transforming a data matrix of any selected dimension into a plurality of data packets which are presented and transmitted in a serial bit stream format. Each data packet is defined by a plurality of data words and one or more address word. Each data word is defined in sequence by an initial start bit, a data byte having a first number of bits and a control byte which includes a steering bit. The steering bit preferably occurs immediately following the occurrence of the last bit of the data byte and has a first level indicative of a word which is not the last address word to occur.

Each address word is defined in sequence by an initial start bit, an address byte having the first number of bits and a second byte which also includes the steering bit which preferably is the first bit immediately following the last bit of the address byte. The steering bit in the last to occur address word if there is more than one address word will have a second level different from the aforementioned first level which indicates that the word is the last to occur address word rather than a data word or an earlier occurring address word. The length and location of the start bit, address byte and control byte in the address word corresponds respectively to the start bit, data byte and the control byte of the data word. The address byte is generated to represent a dimensional identity which is common to all of the data words in the data packet. For example, the dimensional identity may be the identity of a row with each data byte being data from a different column of that row.

The start bit of each data and address word has the same preset constant level which, for example, may be at a low level.

The decoding system for decoding a serial bit stream having the aforedescribed format includes a start bit decoder for sensing the presence of a start bit and a shift register having a number of storage locations equal to the number of bits in each of the data and address bytes. The shift register is coupled to receive the serial bit stream. A shift control circuit is then coupled to the start bit decoder and to the shift register for enabling the shift register to receive a number of bits of the bit stream equal to the total number of bits in address bytes starting with the first bit of the serial bit stream to occur after the occurrence of a start bit caused by the start bit decoder. Finally, the invention includes a control bit circuit for sensing the occurrence of the steering bit in the serial bit stream and generating an output signal when the steering bit has the second level indicative of the fact that the data in the shift register constitutes one or more address bytes comprising the address of the data words in the packet, rather than a data byte.

A suitable utilization circuit may be coupled to receive data shifted out of the shift register as new data is shifted in and to receive the output signal indicative of the occurrence of address information. In addition, parallel transfer of data from the shift register can be provided and coupled to an address decoder whereby the address information contained in the one or more address byte can be decoded and likewise supplied to the utilization circuits.

BRIEF DESCRIPTION OF THE DRAWINGS

A complete understanding of the present invention and of the above and other advantages thereof may be obtained from a consideration of the following description of the preferred embodiments taken in conjunction with the accompanying drawings in which.

DETAILED DESCRIPTION

The present invention is a packet switching system whereby an array or matrix of data is converted to a serial bit string in an encoding circuit, is serially transmitted along a transmission line such as a twisted pair, and is reconstructed into a useful format in a decoding circuit for utilization in a utility or other circuit. For simplicity, the present invention will be described with reference to a specific example of a two-dimensional data matrix consisting of ninety-six, 8-bit data bytes in a twelve column by eight row data matrix stored in a processor memory. It will be appreciated, however, an N-dimensional matrix of any size could be multiplexed in the manner described hereafter.

A significant aspect of the present invention is the sequential, intermittent, serial transmission of the data bytes with at least one common dimensional address, such as all the data bytes in a single row, followed by the transmission of one or more address bytes identifying that common dimensional address.

Each of the data bytes and each of the address bytes if there is more than one are then used to form a data word which consists of a one-bit start byte which, for example, is a single always low bit, an 8-bit byte consisting of either a data byte or an address byte, a 3-bit control byte, and four always high idle or space bits. Each data byte and then the address bytes are sequentially and individually shifted out of the processor in parallel and stored in a shift register. Each such parallel shift occurs during a preset interval. The contents of the shift register defines a data word of which the data or address byte is just one part. Specifically, the word formed in the shift register also includes a steering bit set by a signal generated by the processor. If the shifted data is the last to occur address byte then the processor sets the steering bit high and if the shifted data is a data byte or a first to occur address byte then the processor sets the steering bit low.

In the decoding circuit, either the address byte or the data byte is serially shifted into an 8-bit shift register. If the steering bit indicates the data in the shift register is the last to occur address byte then the shift register data may be outputted to form an address code and an appropriate enable signal sent to a utilization circuit to activate a specified row. This will, in turn, enable, for example, the twelve most recently transmitted data bytes to be parallel shifted from, for example, a 96-bit register into the appropriate row location in utilization circuit. It will be appreciated that the utilization circuit will preferably include a shift register sufficiently long to receive all the data in the data bytes of one data packet. In the illustrated example where each data byte is 8-bits long and there are twelve columns, the display shift register will be at least 96-bits long with the first 96-bits coupled to the appropriate display or storage columns.

Of course, it will be appreciated that the present invention will be applicable to any utilization circuit which requires the bit-by-bit serial transmission of array or matrix of data bytes.

Figure 1:
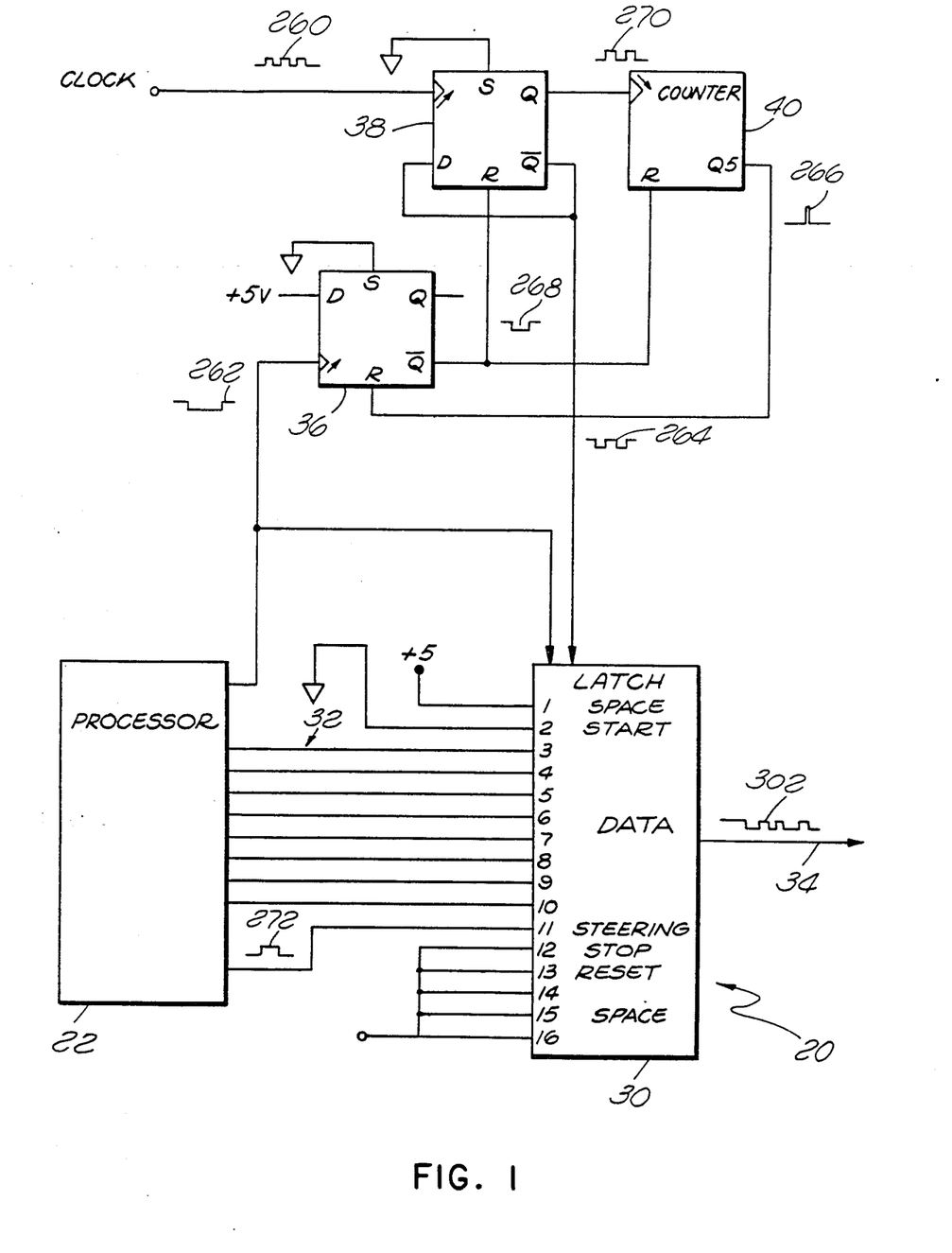
FIG. 1 is a simplified circuit diagram of a serial encoding circuit.
Figure 2:
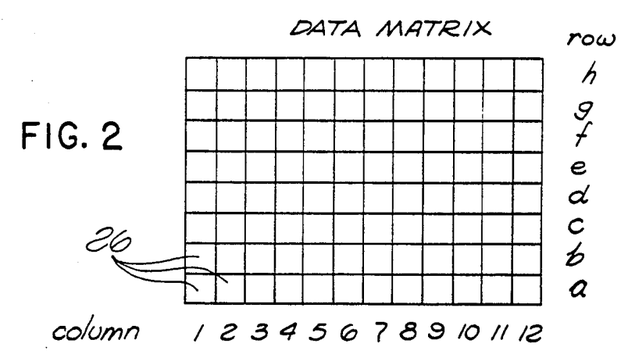
FIG. 2 is a pictorial illustration of a two-dimensional matrix of data bytes to be encoded and transmitted in serial format.
Figure 3:
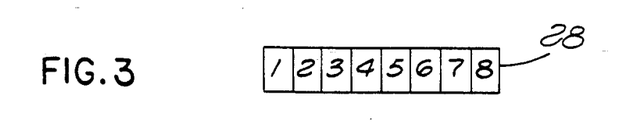
FIG. 3 shows an 8-bit data byte representative of the data stored at each data matrix address in accordance with one example of the present invention.

Referring to FIG. 1, the serial encoding circuit 20 includes a processor 22 in which a data matrix such as the two-dimensional data matrix 24 shown in FIG. 2 is stored. Each storage cell 26 in the data matrix 24 consists of a data byte 28, which in the present example, is taken to be an 8-bit byte as shown in FIG. 3.

In accordance with the invention, the processor 22 is programmed in a conventional manner to first select a row of the matrix and then sequentially transfer the 8-bit data byte from each storage cell in that row to eight bit locations in a sixteen-bit latch register 30. The transfer of each 8-bit data byte is made in parallel along eight data leads 32. To enable the parallel transfer, the processor 22 generates a parallel load enable signal 262 which is coupled to the latch register 30 to enable the latch register 30 to receive and temporarily hold the 8-bit byte from the processor 22.

It will be appreciated that it is not enough simply to transmit a series of data bytes 28 in serial form along a transmission line such as transmission line 34 since there would be no means of synchronizing the decoding circuit to enable it to determine where the beginning of each word was. Consequently, each data or address byte is merely one portion of a larger word which will include at least a start byte, which is set at a fixed level for all data and address words, a control byte which includes a stop bit and a reset bit both of which are set at a fixed level opposite to that of the start byte, and possibly one or more space or idle bits also set at a fixed level opposite to the fixed level of the start byte. The start byte in the present example is taken to be at a fixed low level and the stop, reset and space bits taken to be a fixed high levels. Hence, in FIG. 1, latch bit inputs 1, 14, 15 and 16 (space); 12 (stop); 13 (reset) are fixed to a five volt source while bit 2 (start) is grounded. The data or address bytes generated by the processor 22, are then parallel shifted to bit inputs 3 through 10 when the parallel load signal 262 is low thereby enabling parallel receipt by the latch register 30.

In addition to the parallel load signal 262, the processor 22 also generates a steering signal 272 which will be low unless the information on data lines 32 constitute the last to occur address byte. In the present example, there is only one address byte, however. The steering signal 272 is also coupled to the latch 30 to set the steering bit 11 high if steering signal 272 is high and to set steering bit 11 low if steering signal 272 is low. When the parallel load signal 262 enables the latch 30 to receive data on the data lines 32, bits 1 through 8 of each data byte or address byte are transferred to bits 3 through 10 respectively of the latch 30 and the steering bit 11 is appropriately set low or high.

Figure 4:
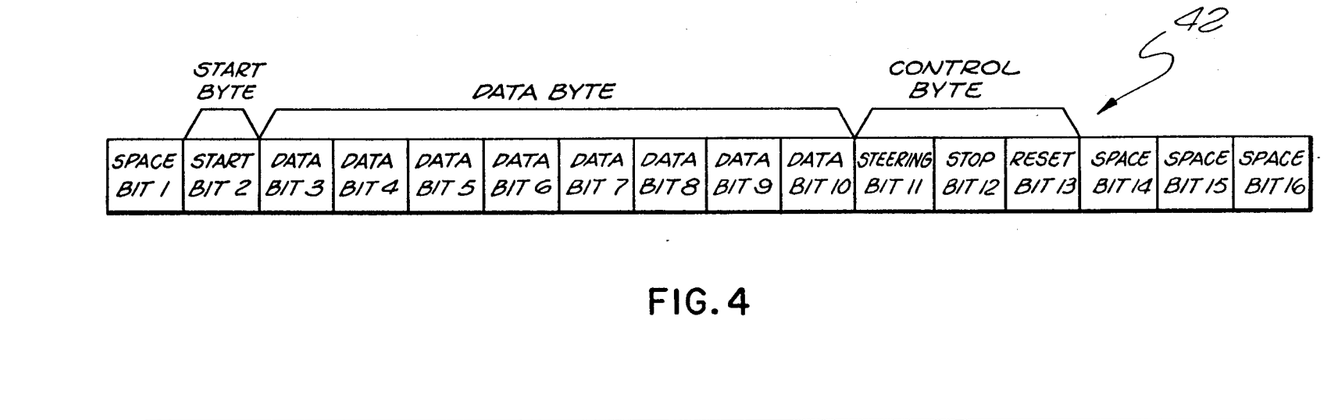
FIG. 4 shows a 16-bit data word which is serially transmitted and decoded in real time in accordance with one example of the invention.

Thus, when a parallel load signal 262 occurs enabling a parallel transfer along data lines 32, a data word 42 as illustrated in FIG. 4 will be generated in the latch 30. Specifically, the data word 42 will consist of an always high space byte in bit 1; an always low start byte at bit 2; an 8-bit data or address byte in bits 3 through 10; a 3-bit control byte consisting of the steering bit 11 which will be low unless bits 3–10 represent the last to occur address byte in a data packet, an always high stop bit 12, and an always high reset bit 13; and three always high space bits.

Figure 5:
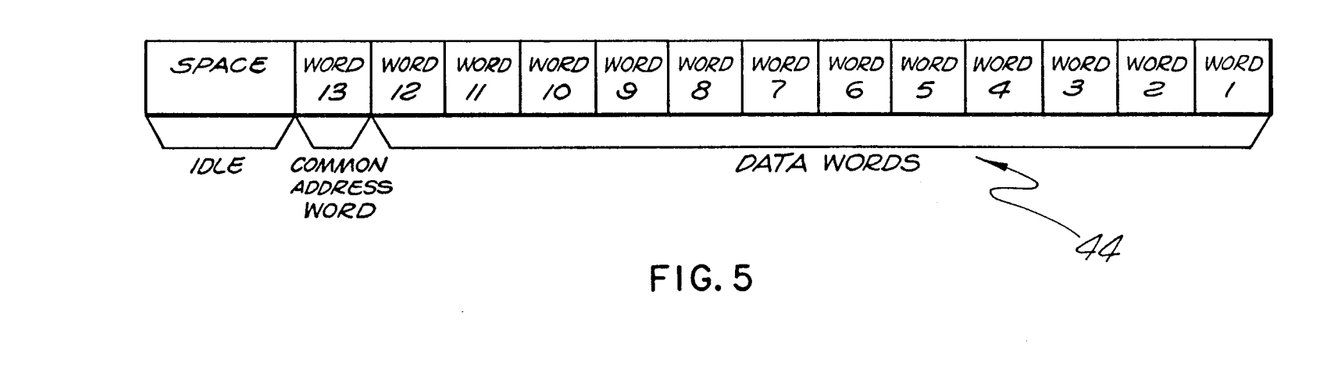
FIG. 5 is a diagram showing one data packet consisting of thirteen data words in accordance with the illustrative example of the invention.

By way of illustration, referring to FIG. 1 in conjunction with FIG. 5, the processor 22 may be programmed to first shift the 8-bit data byte from the column one storage cell of a selected row. The latch 30 receives this first 8-bit data byte along with the steering signal upon occurrence of a low parallel load signal and forms a data word. When the parallel load signal goes high and before it again goes low enabling a parallel transfer, the sixteen bit data word is serially shifted onto the transmission line 34 starting with bit 1 and continuing until the entire data word has been serially transmitted. This first data word is defined as WORD 1. The processor next enables the 8-bit data byte in column 2 of the same row to be transferred to the latch 30 upon the next low going parallel load signal 262 to form WORD 2 which is then similarly transmitted in serial form along the transmission line 34. This sequence continues with columns 3 through 12 in FIG. 2 until all data bytes in a given row (i.e. having the same row address) have been transferred in parallel to the latch 30 and transmitted in serial form along the transmission line 34.

After transferring all the data bytes in a given row, the processor 22 generates an 8-bit address byte which indicates the address of the row from which the previous twelve data bytes were obtained. When the next parallel load signal occurs, this address byte is transferred along the data lines 32 and is stored in bits 3 through 10 of the latch 30. However, at the same time the processor generates a steering signal 272 which is at a high value which, in turn, sets the steering bit 11 in the latch 30 to a high value thereby indicating that the data in bits 3 through 10 is the last to occur address byte in the data packet.

The formation of a series of thirteen words in this specific example including twelve data words having data bytes formed with data from the data matrix 24 and a thirteenth address word having an address byte representative of the row from which the previous twelve data words were obtained, defines a data packet 44 illustrated in FIG. 5. Between each data packet 44, the transmitter will preferably idle for a period of time. All bits during the idle time will be high and hence the signal on the output lead 34 will be high. As will be seen hereafter, the use of the space bits in each data word and the idle time between data packets will facilitate rapid identification of the start bit and hence enable synchronization of the decoding circuit.

Figure 6:
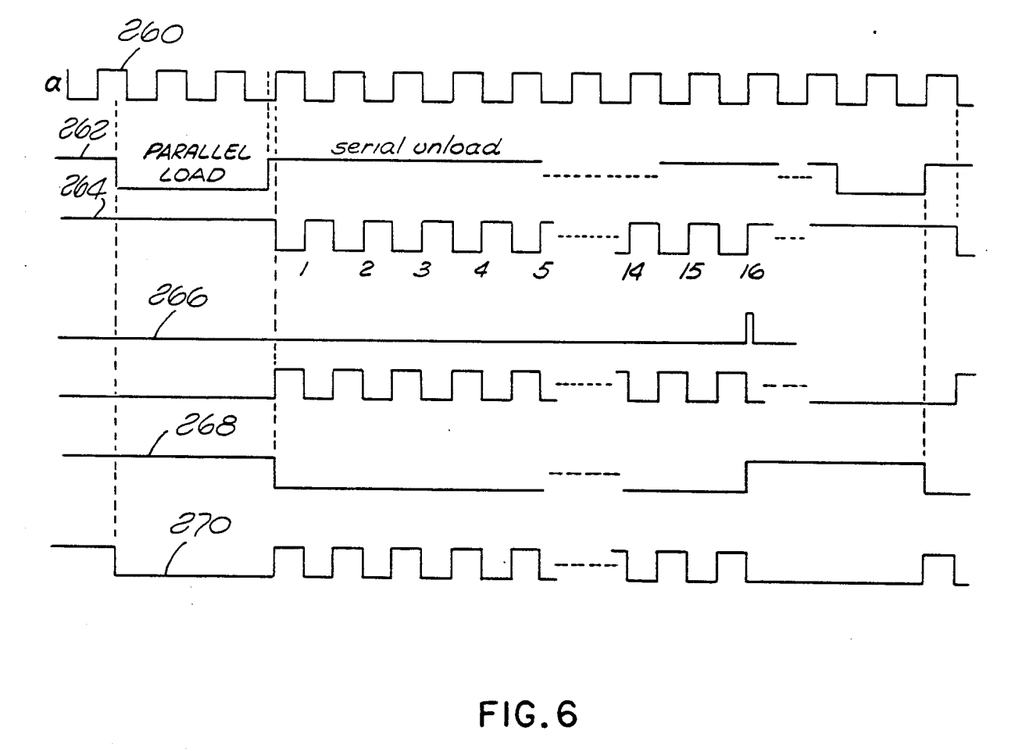
FIG. 6 is a signal timing diagram illustrating the waveforms of the signals at various points of the circuit diagram of FIG. 1.

The serial transfer of a word from the latch 30 may be understood with reference to FIG. 1 in conjunction with the timing diagram of FIG. 6. Specifically, when the parallel load signal 262 is low the latch 30 will be enabled to receive a parallel transfer of data from the processor and will be disabled from effecting a serial transfer of data onto transmission line 34. To effect serial transfer out, the parallel load signal 262 is coupled to the clock input of a CMOS, D type, flip-flop 36 whose D input is tied to +5 volts and whose set input is tied to ground. Thus, on the rising edge of the parallel load signal 262 indicating formation of the parallel load interval, the $\overline{Q}$ output signal 268 of flip flop 36 will go from high to low. The $\overline{Q}$ output signal 268 is coupled to the reset input of a second CMOS, D type, flip flop 38 and to the reset input of a counter 40. Therefore, the transition of the signal 268 from a high state to a low state will enable the counter 40 to begin counting and will enable the clock signal 260 on the clock input of the flip flop 38 to toggle the outputs of the flip flop 38. The output of the flip flop 38 is coupled to the clock input of the counter 40 which counts sixteen clock pulses and upon the sixteenth clock pulse generates a reset signal 266 which is coupled to the reset input of the flip flop 36. This causes the $\overline{Q}$ output of the flip flop 36 to go high which then resets and disables both the flip flop 38 and the counter 40 until the next rising edge of the parallel load signal 262 occurs.

Therefore, the $\overline{Q}$ output signal 264 is coupled to the latch 30 to enable serial transfer therefrom. The signal will comprise a burst of sixteen clock pulses, one for each bit of the latch 30 to be serially transferred onto line 34. Of course, if a different size data word is formed, then the number of clock pulses in each burst will have to be correspondingly adjusted.

In operation, the first bit of the data word in latch 30 will be transferred out along the output lead 34 upon occurrence of the first rising edge of the first pulse in the clock burst comprising $\overline{Q}$ signal 264. Upon the second rising edge of the burst signal 264 the second bit will be transferred along the output lead 34 and so forth until all sixteen bits of the word formed by the latch will have been transferred in serial fashion along the transmission line 34.

In accordance with the specific embodiment illustrated in FIG. 1, flip flops 36 and 38 may be CD4013 type flip flops, the counter 40 may be a CD4040 type counter, and the latch 30 may be pair of 74LS165 latch circuits.

Figure 7:
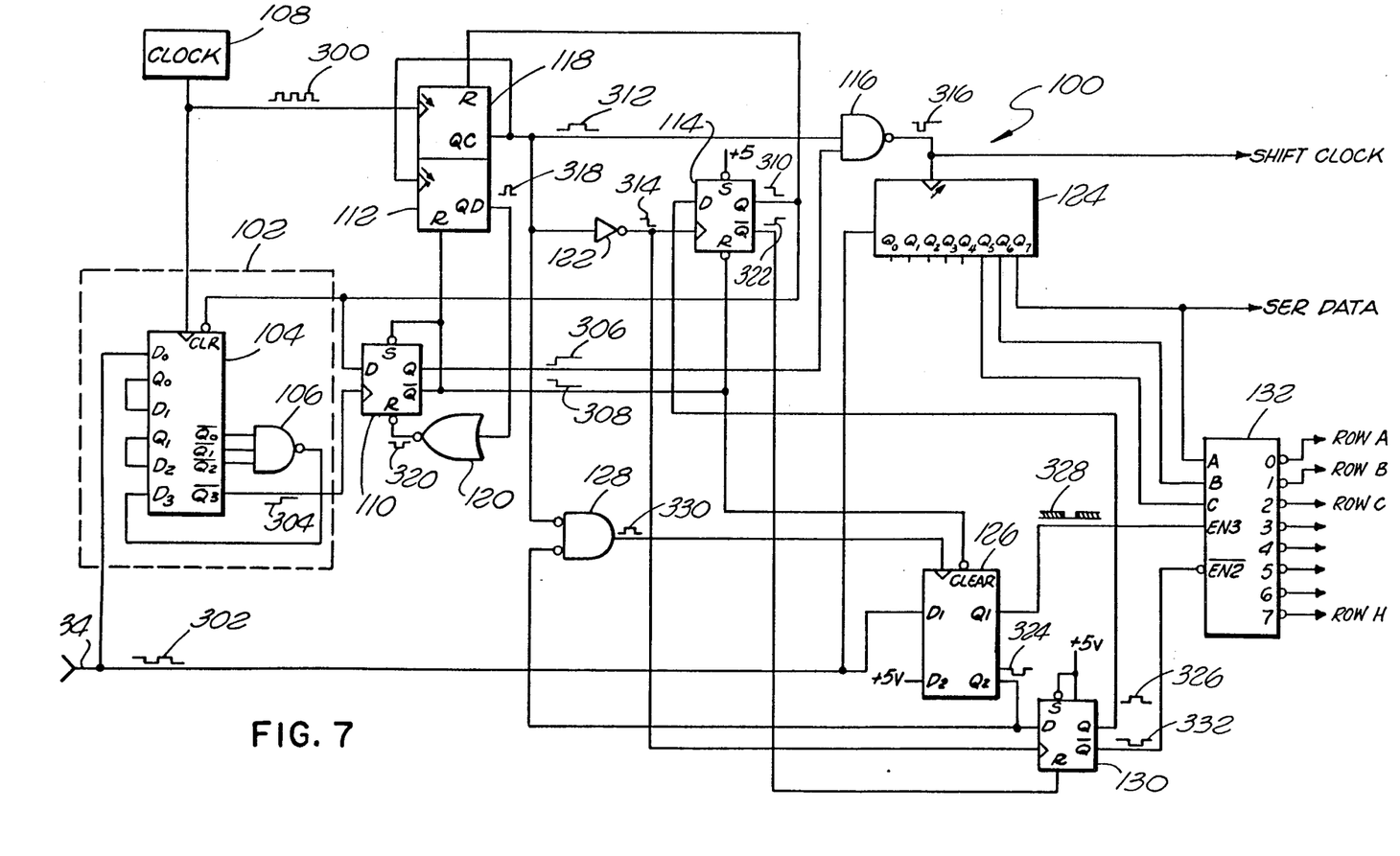
FIG. 7 is a simplified circuit diagram of a decoding circuit for decoding the string of serial data in accordance with the invention.

Turning to FIG. 7, the serial data signal 302 on lead 34 is coupled to a serial decoder circuit 100. It will be appreciated that the only link between the serial decoder circuit 100 and the previously described serial encoding circuit 20 described in FIG. 1 is the data line 34. Hence, it is necessary to synchronize the serial decoder circuit 100 using data received on the data lead 34 in a way that enables the data signal 302 to be properly interpreted and used.

In order to achieve synchronization, the decoder circuit 100 includes a start-bit detector 102 which in one specific example consists of a 4-bit register 104 and appropriate logic 106 to produce a high output signal 304 only if the data input signal 302 coupled to the start-bit detector 102 is zero for four consecutive clock pulses of a clock signal 300 from a clock generator 108.

Figure 8:
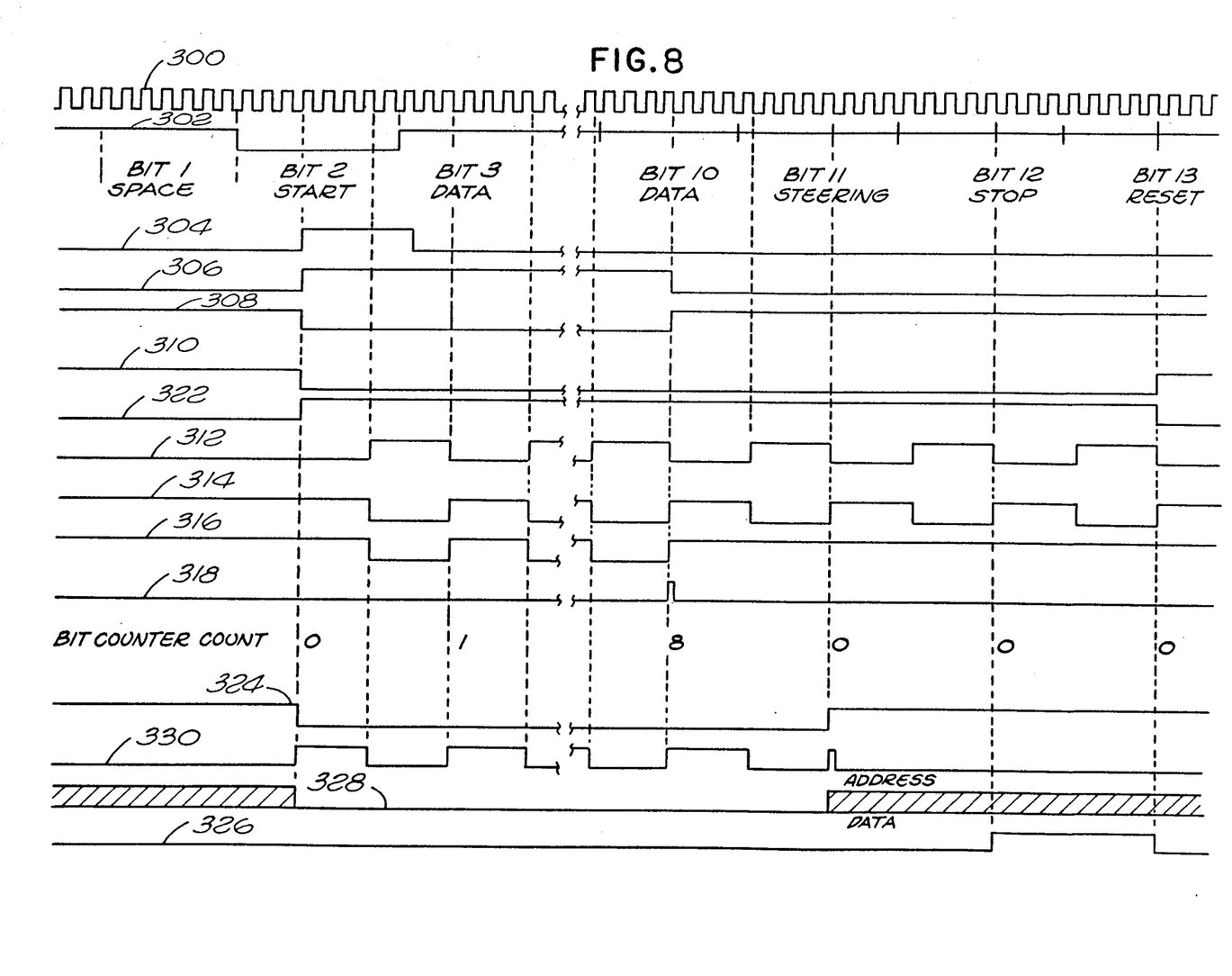
FIG. 8 is a diagram illustrating the waveform of the signals at various locations in the circuit of FIG. 7.

It will be understood that the pulse rate of the clock signal 300 generated by the clock 108 must be greater than the bit rate, i.e., the rate at which data bits are received along data line 34, of the input signal 302. In the illustrated embodiment, the clock 108 is set to have a pulse rate which is eight times the bit rate of the data signal 302. Thus, as shown in FIG. 8, eight clock pulses 300 will occur during the time when each bit of a word appears on the input lead 34. Note, however, that the leading and falling edges of the data word signal 302 and the clock 300 need not and, in general, will not occur at the same time and thus will be out of phase with each other.

As previously indicated, the space bits 1 and 14 through 16 are set to always be at a high state. Consequently, the start bit detector will not cause a trigger signal 304 to occur because the input 302 will never be low for four consecutive clock pulses of the clock 300. However, the start bit of each data word is always low. Consequently, the output or trigger signal 304 will go high upon the rising edge of the fourth clock pulse which occurs after the start bit appears on the data input line 34.

Of course, it will be appreciated that certain of the data bits may also be low and that therefore the serial decoder circuit 100 could be initiated on a word bit in the middle of a word rather than on the start bit. However, an 8-bit counter to be described hereafter, enables word data transfer for only eight bit times. After three additional bit times the start bit detector 102 is reset. Once reset, the start bit detector will begin to look for another word bit which is low after the data on the transmission line has been high for at least four consecutive positive transition edges of the clock signal 300. Because the data word is sixteen bits long and the detector 102 is reset after only 11 bits, there will be a tendency to cause the start bit detector to look at increasingly earlier occuring bits of subsequent data words until the start bit detector finally triggers on the first bit of the data word which has a zero value. This is the start bit in all cases. Thereafter, the start bit detector will trigger only on the start bit. Consequently, the start bit detector 102 will lock onto the start bit of each word generally after no more than several data words have been received even though the initial zero bit of the input data was not in fact the start bit of the received word. Of course, if the start bit detector was reset after sixteen bits rather than eleven bits then the start bit detector would look at the same or increasingly later occurring bits in subsequent data words but would in any event eventually lock onto a proper start bit.

Referring again to FIG. 7, the trigger signal 304 is coupled to the clock input of a latch circuit 110 with the Q output of the latch 110 coupled to one input of an AND gate 116. The Q output of the latch 110 is coupled to the "set" input of the latch 110, to the "reset" input of a latch 114, to the "reset" input of a bit counter 112, and to the "clear" input of dual latch.

In addition to being coupled to the start bit detector 102, the clock 108 is also coupled to the "clock" input of a divide-by-eight clock counter 118. Thus, the output signal 312 of the counter 118 will make a high-to-low or low-to-high transition on the falling edge of each fourth clock pulse of the clock signal 300. The output of the clock counter 118 is then coupled to the "clock" input of the bit counter 112 and to the other input of the AND gate 116. This bit counter 112 generates a pulse signal on its Q output upon the occurrence of the eight falling edge of the signal 312. The Q output of bit counter 112 is then coupled to an inverter 120 whose output is coupled to the "reset" input of latch 110.

The Q output of the clock counter 118 is also coupled to the input of inverter 122 whose output is coupled to the "clock" input of latch 114. Finally, the Q output of the clock counter 118 is coupled to one input of an AND gate 128.

The Q output of the latch 114 is coupled to the "reset" input of the clock counter 118, to the D input of the latch 110 and to the "clear" input of the shift register 104. The $\overline{Q}$ output of the latch 114 is coupled to the "reset" input of a latch 130. The Q output of the latch 130 is coupled to the D input of the latch 114 and the "set" input of latch 114 is coupled to a five-volt source.

The data input line 34 is then additionally coupled to the "data" input of a shift register 124 which in the present example is an 8-bit shift register because each data packet contains only one eight bit address byte. If there are additional address bytes then the shift register will have to be correspondingly expanded so that the shift register has a number of bits equal to the total number of bits in all address bytes in a given data packet. The data input line 34 is also coupled to the D1 input of a dual latch 126. The output of the AND gate 116 is then coupled to the clock input of the shift register 124.

The output of the inverter 122, in addition to being coupled to the "clock" input of the latch 114, is coupled to the clock input of the latch 130. The D2 input of the dual latch 126 is coupled to a five-volt source and the Q2 output of the dual latch 126 is coupled to the D input of the latch 130 and to one input of the AND gate 128. The output of the NAND gate 128 is then coupled to the "clock" input of the dual latch 126. The Q1 output of the dual latch 126, which latches the value of the steering bit at appropriate times, is coupled to a first enable input EN3 of an address decoder 132 and the Q output of the latch 130 is then coupled to a second enable input, EN2, with the "set" input of the latch 130 coupled to a five-volt source.

The Q7 output of the shift register 124 is coupled to a serial data output load which may be coupled to the aforedescribed 96-bit shift register. According to the invention in the illustrated example, the address for a particular row will be uniquely described by three bits of the first three data bits of the addres byte of an address word. Hence, the last three bits, Q5, Q6, and Q7, of register 124 are coupled to the A, B, and C inputs of the address decoder respectively so that when the appropriate signal levels appear on the EN3 and EN2 inputs of the address decoder 132, a low-going signal will be produced on one of the outputs of the address decoder identifying the row with which the twelve previously received data words are associated.

In one embodiment, a 96-bit display register will have shifted therein from the 8-bit register 124, 96 bits of data representing the twelve data bytes in one row. These data bytes will have been shifted in real time through the 8-bit shift register 124 directly into the 96-bit display register. When the thirteenth word, which includes an address byte, is received and stored in the 8-bit register 124, the address decoder will be enabled and a particular row selected. This signal will similarly be coupled to the display apparatus enabling the parallel transfer of 96 bits of data that is twelve data bytes) to activate, e.g., selected lights in a display in the selected row. Since the display will not again be activated until the occurrence of the next enable signal from the address decoder, and because such a signal will not occur until twelve more data bytes have been shifted through the 8-bit shift register 124 and into the display shift register so that another address byte will be positioned in the 8-bit register 124, the address byte can likewise be shifted through the 96-bit shift register just as the data byte would be without affecting the display of data. Stated differently, whenever the address decoder activates a row of the display, the address byte will reside in the 8-bit register 124 and there will be no address byte in the shift register of the display.

Referring to FIG. 7 in conjunction with the timing diagram of FIG. 8, when the start bit is detected by the start bit detector 102, the trigger signal 304 will go high causing the Q output signal 306 of the latch 110 to go high and the $\overline{Q}$ output signal 308 of the latch 110 to go low. When the $\overline{Q}$ signal 308 goes low, the bit counter 112 will no longer be disabled and the Q and $\overline{Q}$ output signals 310 and 322 of latch 114 will go from high-to-low and low-to-high respectively.

When the Q output signal 310 of the latch 114 goes low, the divide-by-eight clock counter 118 is enabled and will generate a clock signal 312 shown in FIG. 8. Eight pulses on the clock signal 312 will be counted in the bit counter 112 whereupon a pulse will be generated at the output of the bit counter 112. This pulse signal will reset latch 110 causing the Q output signal 106 to go from high-to-low and the $\overline{Q}$ output signal 308 to go from low-to-high where they will remain until the next start bit is detected.

Although the bit counter 112 is reset immediately after the pulse on the signal 318 occurs, the clock counter 118 is not immediately reset and therefore continues to generate pulses for three more bit times. However, upon the occurrence of the "count 8" pulse on the signal 318, the Q output signal from the latch 110 having gone low disables the clock signal from the counter 118 from actuating the shift register 124. Hence, after eight data bits have been shifted into the shift register 124, the shift register 124 is disabled and no further data bits are shifted into the shift register 124.

The next bit after the data or address bits in the data or address word is the steering bit. Because the $\overline{Q}$ output signal 308 is high, the dual latch 126 is enabled and upon the first rising pulse of the signal 330 from the gate 128, the Q2 output will go to a high level and the Q1 output signal 328 will assume the value of the steering bit. Hence, if the steering bit is high indicating that all the data in shift register 124 is address data, then the output signal 328 will make a transition during the eleventh bit interval to a high level. Similarly, if the steering bit is zero indicating that the data in the register 124 is not entirely address byte data, then the signal 328 will remain at a low value. It will be appreciated that if the signal 328 is low, then the address decoder 132 will be disabled. It will be appreciated that in the general case a steering bit indicating the shift register contains only address bytes can only occur on the last to occur of the one or more address words received.

Because it is not desired to generate an address signal at the output of the address decoder until the occurrence of the stop bit, the Q output of the latch 130 will remain high for one additional clock period of the clock signal 312 thus disabling the address decoder. However, upon the occurrence of the first falling edge of the clock signal 312 during the time when the stop bit 12 is being received, the signal 332 will go low for one bit time. If the signal 328 is high indicating the data in the register 124 is an address byte, then the address decoder 132 is enabled and the last three bits Q5, Q6, and Q7 will be decoded and a low signal generated on one of the outputs of the address decoder indicating the row to which the immediately preceeding twelve data bytes shifted through the 8-bit register 124, belong.

While the above description is made with reference to a specific example it will be appreciated that numerous variations are possible without departing from the invention. It is therefore the object of the claims to cover all such variations as fall within the true scope of the invention.

What is claimed is:

1. A real time packet switching system for serially transmitting a matrix of data bytes along a transmission means, the matrix having at least one matrix dimension, comprising:

an encoding means comprising:
means for selecting a set of data bytes having one common matrix dimension, each data byte having a plurality of data bits; parallel outputting the data bits of one sequentially selected data byte in said set during each of a plurality of time intervals; generating at least one address byte identifying the common dimension and consecutive shifting each of the at least one address byte after all of the data bytes have been sequentially shifted, the set of data bytes and the identifying address bytes defining a word packet; and generating a steering signal indicative of whether the address byte is the last to occur address byte in the word packet;
latch register means for receiving one of the data-/address bytes and the steering signal during one of the time intervals and forming a word which comprises a data word when the word includes an address byte, and a steering bit set to correspond to the steering signal valve, and
means for serially shifting the formed word from the latch register means to the transmission means at a predefined bit rate during the time period between the predefined intervals and serially transmitting the word along the transmission means at the bit rate; and decoding means comprising:
means for detecting the start of each word appearing on the transmission means,
register means having a number of storage locations equivalent to the sum of all the bits in the address bytes,
means for enabling bit-by-bit serial shifting of just the data and address bytes of the formed word into the register means,
means for sensing the level of the steering bit and using the data in the shift register to generate an address command when the steering bit is at a first level indicating that the data in the shift register comprises the at least one address byte.

2. The packet switching system of claim 1 wherein the word packet comprises a single address word having a single address byte.

3. The packet switching system of claim 1 wherein the means for serially shifting comprises:
a clock for generating a train of clock pulses;
a counter for counting the clock pulses;

means for enabling the latch register means to shift one bit of a word onto the transmission means for transmission therealong upon the occurrence of each clock pulse while the counter is counting;

means for enabling the counter to start counting after the end of each time interval and thereafter to count a number of clock pulses equal to the total number of bits in the word formed in the latch register means and then to disable further shifting of bits from the latch register until after the occurrence of the next time interval.

4. The packet switching system of claim 1 wherein each word includes a start byte set at a constant value, the means for detecting the start of each word comprising:

a receiver clock for generating a series of pulses, the pulse rate of the receiver clock being greater than the bit rate of the serially transmitted word;

means for relatively sampling the value of the serially transmitted word upon the occurrence of a receiver clock pulse; and means for generating a trigger signal when each sample of the serially transmitted word has the constant value for each of a predefined number of consecutive receiver clock pulses.

5. The packet switching system of claim 4 wherein the means for enabling bit-by-bit serial shifting comprises:

a latch for being set upon the occurrence of the trigger signal to generate a first enable signal, the first enable signal coupled to disable the means for detecting the start of each word and for enabling the register means; and reset means for generating a reset pulse when the number of word bits received after the occurrence of the first enable signal is equal to the number of bits in each data/address byte of the data/address words, the reset pulse coupled to terminate the first enable signal whereby the register means is disabled from receiving further word bits.

6. The packet switching system of claim 5 further comprising:

initializing means for generating an initializing signal after the steering bit has been sensed in the sensing means, the initializing signal coupled for enabling the means for detecting the start of each word and resetting the reset means.

7. A packet switching system for encoding, serially transmitting along a transmission line and decoding a matrix of data bytes, comprising:

an encoding circuit for:

generating a word packet including a plurality of data words and at least one address word, each data word comprising a data word start byte, one data byte from the matrix and a data word control byte, each data byte in the word packet having a common dimensional address, each address word in the word packet comprising an address word start byte, one address byte comprising at least a part of the identity of the common dimensional address of the data bytes in the word packet and an address word control byte, and sequentially and serially applying each bit in each data word in the word packet to the transmission line according to a predefined sequence and then applying each bit in each address word to the transmission line;

a decoding circuit coupled to receive the words transmitted over the transmission line comprising:
a start byte detect circuit,
shift register means having a number of storage locations equivalent to the number of bits in the at least one address bytes in the word packet, the shift register means serially shifting the bits of only the data and address byte portions of each word through the shift register,
control means for sensing the value of the data word and address word control bytes and generating an address signal if the data in the shift register represent the common dimensional address of the word packet; and
a utilizing circuit for receiving each data byte shifted out of the shift register and being responsive to the address signal for enabling utilization of the received data bytes in the word packet when the address signal occurs.

8. The packet switching system of claim 7 wherein the word packet comprises a single address word having a single address byte.

9. The packet switching system of claim 7 wherein the encoding circuit comprises:
a clock for generating a train of clock pulses;
a counter for counting the clock pulses;
means for forming a word during a first time period;
means for shifting one bit of the formed word onto the transmission line upon the occurrence of each clock pulse while the counter is counting;
means for enabling the counter to start counting after the end of each first time period and thereafter to count a number of clock pulses equal to the total number of bits in each formed word in the word packet and thereafter to disable further shifting until after the next first time period.

10. The packet switching system of claim 7 wherein the start bit detect circuit comprises:
a receiver clock for generating a series of pulses, the pulse rate of the receiver clock being greater than the bit rate of the serially transmitted word;
means for selectively sampling the value of the serially transmitted word upon the occurrence of a receiver clock pulse; and
means for generating a trigger signal when each sample of the serially transmitted word has the constant value for each of a predefined number of consecutive receiver clock pulses.

11. The packet switching system of claim 10 wherein the shift register means comprises:
a storage register;
a latch for being set upon the occurrence of the trigger signal to generate a first enable signal the first enable signal coupled for disabling the start byte detector and for enabling the storage register to receive word bits; and
reset means for generating a reset pulse when the number of word bits received after the occurrence of the first enable signal is equal to the number of bits in the data/address byte of each data word, the reset pulse coupled to terminate the first enable signal whereby the storage register is disabled from receiving further word bits.

12. The packet switching system of claim 10 further comprising:
initialization means for generating an initializing signal after the steering bit has been sensed in the control means the initializing signal coupled for enabling the start byte detector to sense a start byte and to reset the reset means.

13. A decoding system for receiving and decoding a plurality of word packets representative of a data matrix presented in a serial bit stream format, each word packet defined by a plurality of data words and at least one address word, each data word defined, in sequences, by an initial start byte, a data byte having a first number of bits and a control byte following the data byte, the control byte having a first value; and each address word defined in sequence by an initial start byte, an address byte having the first number of bits and a control byte following the address byte, the control byte having a second value only when the address word is the last address word in the word packet, the length and location of the start byte, the address byte and the control byte in each address word corresponding respectively to the start byte, the data byte and the control byte of the data word, the address bytes of all the address words combining to be the identity of a dimensional common to all the data words in the word packet, the start byte of each data and address word having a preset constant value, the decoding system comprising:

a start byte decoder for sensing the presence of a start byte;

a shift register having a number of storage locations equal to the total number of address bits in all the address bytes, the shift register coupled to receive the serial bit stream, said bits in the bit stream being serially shifted through the shift register;

a shift register control circuit coupled to the start byte decoder and to the shift register for enabling the shift register to receive a number of bits of the bit stream equal to said first number starting with the first bit of the serial bit stream to occur after each occurence of the start byte sensed by the start byte decoder; and a control byte circuit for sensing the occurrence of the control byte in the serial bit stream and generating an output signal when the control byte has the second value indicating that the shift register has stored therein at least one address bytes.

14. The decoding system of claim 13 wherein the word packet comprises a single address word having a single address byte.

15. The decoding system of claim 13 wherein the start byte decoder comprises:

a receiver clock for generating a series of pulses, the pulse rate of the receiver clock being greater than the bit rate of the serially transmitted word;

means for selectively sampling the value of the serially transmitted word upon the occurrence of a receiver clock pulse; and means for generating a trigger signal when each sample of the serially transmitted words has the constant value for each of the predefined number of consecutive receiver clock pulses.

16. The decoding system of claim 15 wherein the shift register control circuit comprises:

a latch for being set upon occurrence of the trigger signal to generate a first enable signal coupled for disabling the start byte decoder and for enabling the shift register to receive the word bits of the bit stream; and reset means for generating a reset signal when the number of bits received after the occurrence of the first enable signal is equal to the number of bits in the data/address byte in the received word, the reset pulse coupled to terminate the first enable signal whereby the shift register is disabled from receiving further word bits.

17. The decoding system of claim 16 further comprising:

initializing means for generating an initializing signal after the control byte has been sensed in the control byte circuit, the initializing signal coupled for enabling the start byte decoder and resetting the reset means.

* * * * *